UNITED STATES PATENT OFFICE.

FREDERICK REVERDIN, OF GENEVA, SWITZERLAND, ASSIGNOR TO NEWPORT CHEMICAL WORKS, INC., OF MILWAUKEE, WISCONSIN.

PROCESS FOR THE BENZOYLATION OF ORGANIC AMIDO COMPOUNDS.

1,296,602. Specification of Letters Patent. Patented Mar. 4, 1919.

No Drawing. Application filed July 16, 1918. Serial No. 245,261.

*To all whom it may concern:*

Be it known that I, FREDERICK REVERDIN, a citizen of the Confederation of Switzerland, and resident of Geneva, in the Canton of Geneva, Switzerland, have invented certain new and useful Improvements in Processes for the Benzoylation of Organic Amido Compounds; and I do hereby declare that the following is a full, clear, and exact description thereof.

This invention is a process for the benzoylation of organic compounds containing one or more amido groups.

The benzoylation of organic compounds containing one or more amido groups, i. e. $NH_2$, is generally made by benzoylchlorid in the presence of a solvent and at more or less high temperatures. It is also sometimes done by means of benzoic anhydrid.

I have found that the benzoylation by means of benzoyl chlorid can be simplified and facilitated by the addition of a small amount of sulfuric acid to the mixture to be benzoylated with benzol chlorid. Thus for instance, by dissolving trinitro-2-3-5-p-anisidin in benzoyl chlorid and adding a few drops of concentrated sulfuric acid, then heating for a moment on the water bath, the benzoyl-trinitro-2-3-5-p-anisidin, a product that up to the present time has not been obtained by ordinary means, is immediately obtained.

The same holds true for dinitro-2-4-anilin, the known benzoylated derivative of which had, up to the present time, been obtained only in the presence of solvents or at high temperatures.

The value of the new process lies in the fact that it can be used for the preparation of benzoylated derivatives that are used industrially, as for instance for the preparation of the benzoylated derivatives of the amino-anthraquinones, among which the benzoyl-1-aminoanthraquinone forms an important vat dyestuff, known under the name of algol-yellow WG; this dyestuff may be obtained, according to my process, by simply heating on the water bath, until hydrochloric acid gas no longer escapes, the mixture of amino-1-anthraquinone and benzol chlorid under addition of two or three drops of concentrated sulfuric acid and working, for instance, on 5 grams of amino-anthraquinone. According to my method the use of a solvent is avoided and it is no longer necessary to heat to a high temperature (200–205° C.) at which the operation must be carried out according to the known process for the preparation of the said dyestuff.

I claim:

The process herein described for the benzoylation of organic compounds of the amido group by reaction of benzol chlorid on the said compounds, which consists in the addition of a small amount of concentrated sulfuric acid to the mixture of amido derivatives and benzoyl chlorid, the reaction taking place at moderate temperatures and without the use of a solvent.

In testimony that I claim the foregoing I have hereunto set my hand at Geneva, in the Canton of Geneva, Switzerland.

FREDERICK REVERDIN.

Witnesses:
LOUIS H. MUNIER,
J. DIVONE.